(12) United States Patent
Brock

(10) Patent No.: US 11,057,462 B2
(45) Date of Patent: Jul. 6, 2021

(54) ASSET MANAGEMENT BLOCK CHAIN

(71) Applicant: Bank of America Corporation, Charlotte, NC (US)

(72) Inventor: Thomas V. Brock, Carrollton, TX (US)

(73) Assignee: Bank of America Corporation, Charlotte, NC (US)

( * ) Notice: Subject to any disclaimer, the term of this patent is extended or adjusted under 35 U.S.C. 154(b) by 208 days.

(21) Appl. No.: 15/936,607

(22) Filed: Mar. 27, 2018

(65) Prior Publication Data
US 2019/0306232 A1   Oct. 3, 2019

(51) Int. Cl.
| H04L 29/08 | (2006.01) |
| H04L 29/06 | (2006.01) |
| H04L 9/06 | (2006.01) |
| H04L 29/12 | (2006.01) |

(52) U.S. Cl.
CPC ........ *H04L 67/1046* (2013.01); *H04L 9/0637* (2013.01); *H04L 9/0643* (2013.01); *H04L 63/061* (2013.01); *H04L 63/08* (2013.01); *H04L 67/1048* (2013.01); *H04L 67/1097* (2013.01); *H04L 61/6022* (2013.01); *H04L 67/12* (2013.01); *H04L 2209/38* (2013.01)

(58) Field of Classification Search
CPC ............. H04L 2209/38; H04L 2209/56; H04L 67/104; H04L 41/0893; H04L 67/1097; H04L 67/1046; H04L 67/1048; H04L 67/12; H04L 63/061; H04L 63/08; H04L 9/0637; H04L 9/0643; H04W 84/18; H04W 12/009
See application file for complete search history.

(56) References Cited

U.S. PATENT DOCUMENTS

| 8,955,091 B2 | 2/2015 | Kailash et al. |
| 9,319,404 B2 * | 4/2016 | Svigals ............... H04L 63/0861 |
| 9,485,231 B1 | 11/2016 | Reese |
| 9,565,192 B2 | 2/2017 | Chillappa et al. |
| 9,591,016 B1 | 3/2017 | Palmieri et al. |
| 9,699,659 B2 | 7/2017 | Zehavi et al. |

(Continued)

OTHER PUBLICATIONS

Matt Hamblen, "Cius is About Giving Control Back to IT, Cisco Says," https://www.computerworld.com/article/2509680/computer-hardware/cius-is-about-giving-control-back-to-it--cisco-says.html, Retrieved on Feb. 12, 2018.

(Continued)

*Primary Examiner* — Gregory G Todd
(74) *Attorney, Agent, or Firm* — Weiss & Arons LLP; Michael A. Springs, Esq.

(57) ABSTRACT

Apparatus and methods for establishing a permissioned blockchain on an Internet of Things ("IoT") system. The method may be performed by a central IoT hub. The method may include identifying a IoT nodes associated with the IoT system. The method may also include running an authentication routine on the identified IoT nodes. The method may further include identifying a subset of the IoT nodes that have been authenticated by the authentication routine. The method may further include grouping the subset of IoT nodes into a first group of IoT nodes and a second group of IoT nodes, the grouping being based at least in part on available storage space and processing speed of each of the subset of IoT nodes.

18 Claims, 4 Drawing Sheets

(56) References Cited

U.S. PATENT DOCUMENTS

| | | | |
|---|---|---|---|
| 9,699,814 | B2 | 7/2017 | Zakaria et al. |
| 9,716,595 | B1 | 7/2017 | Kravitz et al. |
| 9,729,528 | B2 | 8/2017 | Zakaria et al. |
| 9,825,921 | B2 | 11/2017 | Reese |
| 9,875,510 | B1 | 1/2018 | Kasper |
| 10,251,053 | B1 | 4/2019 | Paczkowski et al. |
| 10,425,414 | B1 * | 9/2019 | Buckingham ............ G06F 21/35 |
| 10,754,847 | B2 * | 8/2020 | Esposito, II .......... H04L 9/3239 |
| 10,841,303 | B2 * | 11/2020 | Bowling ............... H04L 63/029 |
| 2016/0173495 | A1 | 6/2016 | Joo |
| 2016/0248746 | A1 | 8/2016 | James et al. |
| 2016/0259937 | A1 | 9/2016 | Ford et al. |
| 2016/0260095 | A1 | 9/2016 | Ford |
| 2016/0337127 | A1 * | 11/2016 | Schultz ................... H04W 4/70 |
| 2016/0366181 | A1 | 12/2016 | Smith et al. |
| 2017/0161051 | A1 * | 6/2017 | Nikam ..................... G06F 9/485 |
| 2017/0163444 | A1 | 6/2017 | McLaughlin et al. |
| 2017/0289184 | A1 | 10/2017 | C et al. |
| 2017/0308893 | A1 | 10/2017 | Saraniecki |
| 2018/0144292 | A1 * | 5/2018 | Mattingly ............. G06F 16/903 |
| 2018/0253451 | A1 | 9/2018 | Callan et al. |
| 2018/0350451 | A1 * | 12/2018 | Ohnemus ............ G06F 19/3418 |
| 2019/0065733 | A1 * | 2/2019 | Forehand .............. H04L 9/3247 |
| 2019/0166101 | A1 * | 5/2019 | Ramos .................. H04L 9/0827 |
| 2019/0172566 | A1 | 6/2019 | Schulman et al. |
| 2019/0207751 | A1 * | 7/2019 | Harvey ................. H04L 9/0643 |
| 2019/0289454 | A1 | 9/2019 | Inoue |
| 2019/0349190 | A1 * | 11/2019 | Smith ................. G06F 16/1834 |
| 2019/0349426 | A1 * | 11/2019 | Smith ................... H04W 84/22 |
| 2019/0373472 | A1 * | 12/2019 | Smith ................... H04L 9/3239 |

OTHER PUBLICATIONS

Nolan Bauerle, "What is the Difference Between Public and Permissioned Blockchains?" https://www.coindesk.com/information/what-is-the-difference-between-open-and-permissioned-blockchains, Retrieved on Feb. 19, 2018.

"Explainer-Permissioned Blockchains," https://monax.io/explainers/permissioned_blockchains/, Retrieved on Feb. 19, 2018.

Conoscenti et al., "Peer to Peer for Privacy and Decentralized in the Internet of Things," 2017, IEEE, pp. 288-290. (Year: 2017).

"Global Hacker Botnet tops 6 million hijacked devices," http://www.computerweekly.com/news/450427023/Global-hacker-botnet-tops-6-million-hijacked-devices, Sep. 27, 2017.

"Blockchain," https://www.investopedia.com/terms/b/blockchain.asp, Retrieved on Feb. 15, 2018.

"MAC Address," https://en.wikipedia.org/wiki/MAC_address, Retrieved on Feb. 13, 2018.

"Distributed Ledgers," https://www.investopedia.com/terms/d/distributed-ledgers.asp, Retrieved on Feb. 15, 2018.

"Blockchain," https://en.wkipedia.org/wiki/Blockchain, Retrieved on Feb. 15, 2018.

"Runbook," https://en.wikipedia.org/wiki/Runbook, Retrieved on Jan. 30, 2018.

"Network Access Control," https://en.wikipedia.org/wiki/Network_Access_Control, Retrieved on Feb. 14, 2018.

* cited by examiner

ASSET MANAGEMENT BLOCK CHAIN

FIELD OF TECHNOLOGY

Aspects of the disclosure relate to providing apparatus and methods for asset management. In particular, the disclosure relates to apparatus and methods for managing the assets of an IoT network using a blockchain.

BACKGROUND

Asset management is an integral part of ensuring the health and security of a network. Network asset management includes an accurate knowledge of devices on the network. In many networks, however, it is possible for a device to add itself to the network without computer personnel being aware of its addition.

Asset management also includes the knowledge of the history of the network devices. This knowledge is crucial for managing network compliance with policies, rules, regulations, and in executing mandatory or periodic assessments or reassessments.

Internet of Things ("IoT") networks introduce many difficulties in network asset management that are not prevalent in typical networks. For example, because devices that in an IoT system may support different communication protocols, many IoT nodes may be unable to communicate with each other and establish a connection to a central hub. This makes it difficult both to ascertain which devices are on the network and to keep historical data on the network devices.

It would be desirable, therefore, to provide apparatus and methods for an IoT system that keeps an accurate record of IoT nodes present on an IoT system. It would be further desirable to provide apparatus and methods for an IoT system that records the history of the IoT nodes to simplify, among other things, management of network compliance routines.

SUMMARY OF THE DISCLOSURE

Systems and methods are provided for establishing a permissioned blockchain on an IoT system. The method may be performed by a central IoT hub. The method may include identifying IoT nodes associated with the IoT system. Each of the IoT nodes may have an IP address. Each of the IoT nodes may be in communication with the central hub via an internet connection.

The method may include running an authentication routine on each of the identified IoT nodes. The authentication routine may include assessing configuration settings and IoT node characteristics of the IoT nodes to assess compliance with a IoT system runbook stored on the central IoT hub. The method may include identifying a subset of the IoT nodes that have been authenticated by the authentication routine.

The method may include grouping the subset of IoT nodes into a first group of IoT nodes and a second group of IoT nodes. The grouping may be based at least in part on available storage space and processing speed of each of the subset of IoT nodes.

The method may include creating a ledger including a plurality of entries. Each entry may be associated with a node in the first group or the second group. Each entry may include an IP address and configuration information assessed by the authentication routine of the associated node.

The method may include creating a permissioned blockchain including a distributed ledger by downloading, on the first group, the ledger and a security key. The method may include instructing the first group to exclusively accept blocks hashed using the security key and transmitted from a device having an IP address included in the ledger.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
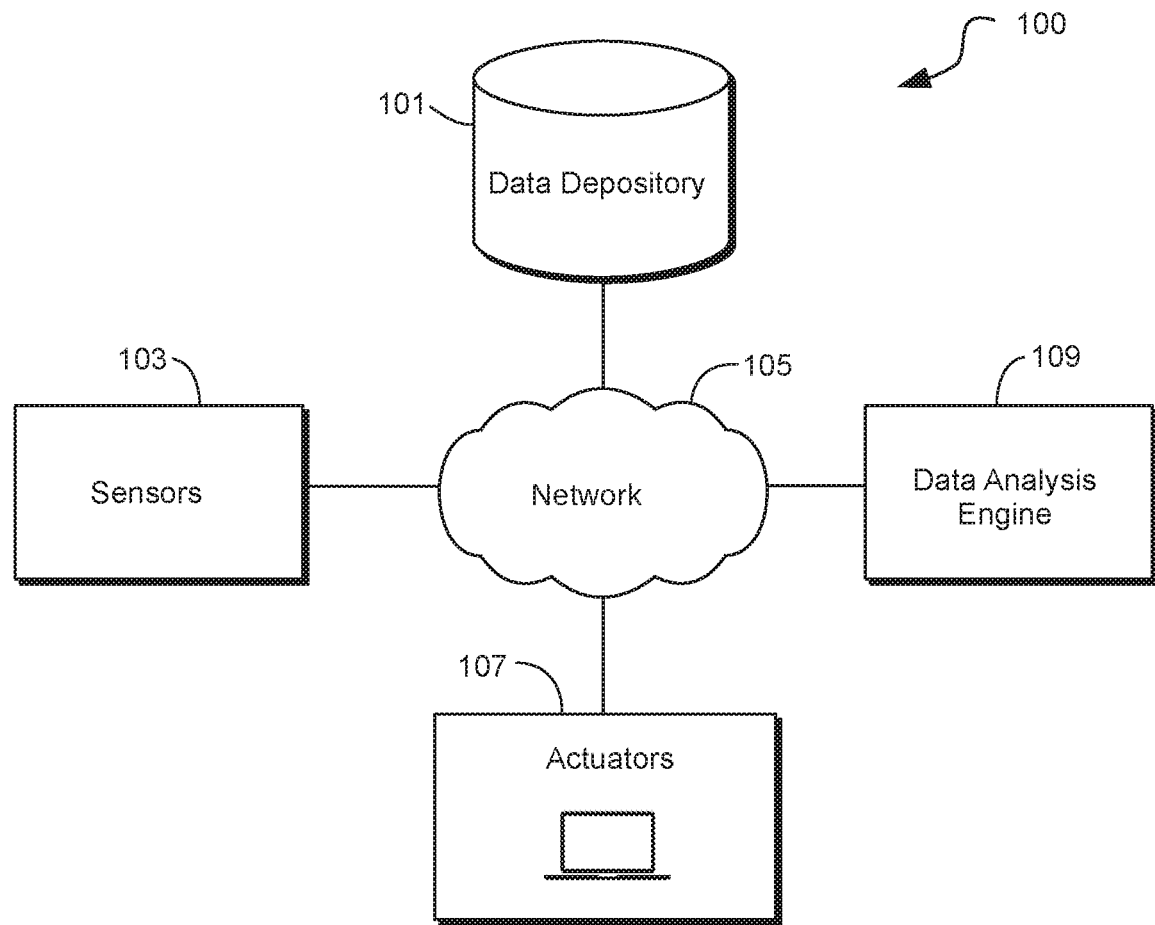
FIG. 1 shows an illustrative system in accordance with the invention.

Apparatus and methods for establishing a permissioned blockchain on an Internet of Things ("IoT") system are provided. The apparatus and methods may be implemented on any suitable hardware device, such as a mobile phone, tablet, personal computer, television, server, watch, appliance, RFID tag, or any other hardware or software devices that supports a connection to one or more communication networks.

The method may be performed by a central IoT hub. An exemplary central IoT hub includes a mobile phone, a computer, or a central processing unit stored in a cloud. The method may include identifying IoT nodes associated with the IoT system. Each of the identified IoT nodes may have an IP address. Each of the identified IoT nodes may be in communication with the central IoT hub via an internet connection. Exemplary IoT nodes include phones, computers, smart watches, appliances, tablets, televisions, servers, and any other hardware that supports an internet connection.

In some embodiments, identified IoT nodes may include IoT nodes that support internet communication and/or IoT nodes that support any other methods of wireless or wire-based communication that are received by the IoT hub.

The method may include running an authentication routine on each of the IoT nodes. The authentication routine may include assessing configuration settings and IoT node characteristics of the IoT nodes to assess compliance with a IoT system runbook stored on the central IoT hub. Exemplary data that may be assessed during the authentication routine includes security settings, communication protocols, transmission speeds, database storage capacity and any other suitable node data.

The method may include identifying a subset of the IoT nodes that have been authenticated by the authentication routine. In some embodiments the subset may include all of the identified IoT nodes.

The method may include grouping the IoT nodes in the subset into a first group and a second group. The grouping may be based at least in part on one or more of available storage space, processing speed, security settings, and any other node characteristics described herein.

The grouping may include comparing an available storage space, a speed of internet connectivity and security settings of each of the IoT nodes in the subset to threshold values of storage space, speed of internet connectivity and security settings. The grouping may also include including in the first group IoT nodes in the subset that have been determined, during the comparison, to meet or exceed the threshold values of storage space, speed of internet connectivity and security settings.

The method may include creating a ledger including a plurality of entries. Each entry may be associated with an IoT node in the subset. Each entry may include an IP address of the node and configuration information of the node assessed during the authentication routine. Each entry may also include a media access control ("MAC") address and configuration information of each node in the subset.

The method may include creating a blockchain. The blockchain may be a permissioned blockchain. Creating the blockchain may include creating a distributed ledger. The distributed ledger may be created by downloading, on the first group, the ledger and a security key.

During the grouping, IoT nodes that are able to handle the requirements of storing a blockchain and creating new blocks may be grouped into the first group. IoT nodes that are unable to handle the requirements of storing a blockchain and creating new blocks may be grouped into the second group.

The method may also include instructing the first group to only accept blocks for adding to the blockchain that are hashed using the security key and transmitted from a device having an IP address included in the ledger.

The method may further include instructing the first group to hash all blocks created for adding to the block chain with the security key.

The method may further include instructing a first IoT node included the first group to identify a second IoT node in electronic communication with the first IoT node. The second IoT node may be a node that does not support internet communication. The method may further include instructing the first IoT node to run at least a portion of the authorization routine on the second IoT node. The authorization routine may be transmitted to the first IoT node from the IoT hub.

The method may further include assigning the first IoT node as an owner of the second IoT node. The method may further include instructing the first IoT node to, in the event that the second IoT node is authenticated during the routine, create a block for adding to the blockchain, the block identifying the second IoT node and the first IoT node as an owner of the second IoT node. The method may further include instructing the first IoT node to, in the event that the second IoT node is authenticated during the routine, transmit the block to the IoT hub and the IoT nodes in the first group.

Assigning the IoT node as an owner of the second IoT node may enable the IoT hub to remotely manage of an IoT node that is otherwise inaccessible to the IoT hub. The IoT node may be inaccessible to the IoT hub because the IoT node does not support internet communications and the IoT hub is a cloud-based device or any other remote devices that can only support communications with nodes through the internet. The IoT node may be inaccessible to the IoT hub because of a physical distance between the node and the hub, because the node uses communication protocols not supported by the IoT hub, or for any other reason.

In the embodiments when the identified IoT nodes include IoT nodes that support internet communication and/or IoT nodes that support any other methods of wireless or wire-based communication, an exemplary second IoT node may be an IoT node that is not in electronic communication with the IoT hub but is in communication with the first IoT node.

The method may further include instructing the first IoT node to, in the event that the second IoT node is not authenticated during the routine, block all communication between the first IoT node and the second IoT node.

The method may further include instructing a third IoT node included the second group to: identify a fourth IoT node in electronic communication with the third IoT node, wherein the fourth IoT node does not support internet communication; run at least a portion of the authorization routine on the fourth IoT node, the authorization routine being transmitted to the third IoT node from the IoT hub; and transmit results of the authorization routine to the IoT hub.

In the embodiments wherein the identified IoT nodes include IoT nodes that support internet communication and/or IoT nodes that support any other methods of wireless or wire-based communication, an exemplary fourth IoT node may be an IoT node that is not in electronic communication with the IoT hub but is in communication with the third IoT node.

The method may further include determining if the fourth IoT node was authenticated during the authentication routine. In the event that the fourth IoT node is determined to be authenticated during the routine, the method may include assigning the third IoT node as an owner of the fourth IoT node; creating a block for adding to the blockchain, the block identifying the fourth IoT node and the third IoT node as an IoT node owner of the fourth IoT node; and transmitting the block to the IoT nodes in the first group. In the event that the fourth IoT node is determined not to have been authenticated during the routine, the method may include instructing the third IoT node to block all communication between the third IoT node and the fourth IoT node.

The method may also include instructing each of the IoT nodes in the first group to identify a third group of IoT nodes in electronic communication with the each of the IoT nodes in the first group, the IoT nodes in the third groups not supporting internet communications.

In the embodiments when the identified IoT nodes include IoT nodes that support internet communication and/or IoT nodes that support any other methods of wireless or wire-based communication, an exemplary IoT nodes in the third group may be IoT nodes that are not in electronic communication with the IoT hub but are in communication with one or more IoT nodes in the first group.

One or more of the IoT nodes in the first group may each identify one or more third groups of IoT nodes. Some of the IoT nodes in the first group may not identify any third groups of IoT nodes.

The method may also include assigning an IoT node owner to each IoT node included in the third groups. In the event that an IoT node included in a third group is in electronic communication with one, two or more nodes in the first and second group, only one IoT node may be assigned as an owner to the third group IoT node.

The IoT node owner may be an IoT node in the first group which is in electronic communication with the owned IoT nodes. An IoT node owner may own one, two or more IoT nodes. For the purposes of the application, an owned IoT node may be a node assigned to a IoT node owner by the IoT hub.

The method may further include assigning the first IoT hub as an owner of the first and second groups of IoT nodes. The method may also include creating a block to add to the blockchain, the block associating each of the IoT nodes in the first, second and third groups with an owner, the owner being either the IoT hub or an IoT node owner.

The method may further include instructing each of the IoT nodes in the second group to identify a fourth group of IoT nodes in electronic communication with the each of the IoT nodes in the second group, the IoT nodes in the fourth groups not supporting internet communications.

In the embodiments when the identified IoT nodes include IoT nodes that support internet communication and/or IoT nodes that support any other methods of wireless or wire-based communication, an exemplary IoT nodes in the fourth group may be IoT nodes that are not in electronic communication with the IoT hub but are in communication with one or more IoT nodes in the first group.

The method may also include assigning an IoT node owner to each IoT node included in the fourth groups, the IoT node owner being an IoT node in the second group which is in electronic communication with the owned IoT nodes. In the event that an IoT node in a fourth group has already been assigned an IoT node owner, for example when the IoT node is in electronic communication with an IoT node in the first group and an IoT node in the second group, the IoT node in the fourth group may not be assigned an additional IoT node owner.

The method may also include creating a block to add to the blockchain. The block may associate each of the IoT nodes in the fourth groups with an IoT node owner, the owner being an IoT node in the second group.

The method may further include, upon a lapse of a predetermined time period following the running of the authentication routine: assessing the compliance of the first and second groups of IoT nodes with the IoT system runbook; creating a block to add to the blockchain, the block including data associated with the assessed compliance of each of the IoT nodes included in the first and second groups; and transmitting the block to the first group.

The method may also include downloading on each of the IoT node owners at least a portion of the IoT system runbook. The method may also include instructing each of the IoT node owners to assess the compliance of the owned IoT nodes with the at least a portion of the IoT system runbook. The method may also include instructing each of the IoT node owners to create a block to add to the blockchain, the block including data associated with the assessed compliance of the owned IoT nodes. The method may further include instructing each of the IoT node owners to transmit the block to the IoT hub and the first group.

The method may additionally include instructing the IoT node owners to run one or more remedial algorithms on owned IoT nodes that are identified as noncompliant with the IoT system runbook during the assessment.

The method may additionally include blocking all communications from IoT nodes in the first and second groups determined to be noncompliant with the IoT system runbook.

The method may additionally include instructing IoT node owners to block all communications from owned IoT nodes that are determined to be noncompliant with the IoT system runbook by their respective IoT node owners.

After performing the grouping, the method may include determining that available storage space on a first IoT node in the first group has dropped below the threshold value of storage space. In response to the determination, the method may include deleting the first IoT node from the first group and adding the first IoT node to the second group. The method may also include instructing the first IoT node to delete the distributed ledger from a first IoT node database.

After performing the grouping, the method may include determining that security settings of a first IoT node in the first group are no longer in compliance with required/threshold security settings for first group IoT nodes. In response to the determination, the method may include deleting the first IoT node from the first group and adding the first IoT node to the second group. The method may also include instructing the first IoT node to delete the distributed ledger from a first IoT node database.

Prior to adding the first and second groups of IoT nodes to the ledger, the method may include transmitting a confirmation request to a systems manager. The method may also include, upon receipt of a delete instruction from the systems manager, removing one or more IoT nodes from the first or second group of IoT nodes. The method may include receiving a request to add one or more IoT nodes to the first or second groups, and adding the IoT nodes as requested.

After formation of the blockchain, the method may include receiving a request from a new IoT node to be added to the IoT system, the new IoT node supporting internet communication. The method may also include running the authentication routine on the new IoT node. The authentication routine may include assessing configuration settings and IoT node characteristics to determine compliance with the IoT system runbook. If the new IoT node is authenticated by the authentication routine, the method may include adding the new IoT to the first group or the second group. The new IoT may be added to the first or second group be based at least in part on available storage space, processing speed, security settings, or other settings of the new IoT node. The method may also include creating a block for adding to the blockchain. The block may include an entry associated with the new IoT node. The entry may include an IP address of the new IoT node and configuration information assessed during the authentication routine. The method may further include transmitting the block to the first group of IoT nodes. If the new IoT node is added to the first group, the method may include downloading the distributed ledger on the new IoT node. If the new IoT node is added to the second group, the method may include not downloading the distributed ledger on the new IoT node.

The method may include performing a system update of the IoT system. The performing of the system update may include receiving an update to the system IoT runbook. The method may include updating the first and second groups of IoT nodes to conform with the system update and creating one or more blocks identifying the updating of the first and second groups. The method may also include instructing each IoT node owner in the first group to: update IoT nodes in the third groups which are owned by the IoT node owner to conform with the system update; and create a block for adding to the blockchain, the block identifying the updating of the owned IoT nodes in the third group. The method may additionally include instructing each IoT node owner in the second group to: update IoT nodes in the fourth group which are owned by the IoT node owner to conform with the system update; and transmit information associated with the update to the IoT hub. The method may also include creating a block identifying the updating of the IoT nodes in the fourth group.

The method may further include restarting one or more IoT nodes in the first group or the second group that failed to conform with the system update during the updating of the first and second groups of IoT nodes.

The method may also include transmitting to each IoT node owner a remedial update routine and instructing each IoT node owner to run the remedial update routine on IoT nodes that failed to conform with the system update.

The method may additionally include, when the IoT node owners include a first IoT owner and a second IoT owner, receiving an instruction to delete the first IoT node from the IoT system. The method may also include instructing the first IoT node to delete itself from the IoT system. The method may further include identifying a group of IoT nodes assigned to the first IoT owner. The method may also include assigning the first group of IoT nodes to the second IoT owner. The method may furthermore include creating a new block identifying the second IoT owner as the new owner of the group of IoT nodes.

The method may also include receiving a request for information transmitted from an IoT node included the first group or the second group. The request may include a request for information categorized as sensitive information in a central IoT hub database. The method may also include transmitting a warning message to a central server identifying the request and the IoT node that transmitted the request.

A method for securing a network comprising a plurality of IoT nodes and one or more IoT hubs, each of the IoT hubs being in communication with one or more IoT nodes, is provided.

The method may include authenticating an IoT node to the network using an authentication method. The authentication method may include comparing configuration settings of the IoT node to defined network configuration settings and identifying an IoT hub as an owner of the IoT node. A single IoT hub may be identified as an owner of the IoT node.

The method may also include updating an ownership block chain stored on each of the one or more IoT hubs. The updating may include associating the IoT node with the IoT hub identified as the owner of the IoT node.

Upon the lapse of a predetermined time period from the completion of the first authentication, the method may include re-starting the authentication method of the IoT node. If, during the authentication process, a configuration setting of the IoT node does not conform to the network access control protocols of the network, the method may include initiating a remedial algorithm to conform the IoT node's configuration setting to the network access control protocol. In response to a failure of the remedial algorithm to conform the IoT node's configuration setting to the network access control protocol the method may include removing the IoT node from the ownership block chain and disallowing communication between the IoT node and the one or more IoT hubs and the one or more IoT nodes. The method described above may be performed for two, three, or more nodes, or for all the nodes on the IoT system.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows illustrative system architecture 100. Architecture 100 may represent an interne of things ("IoT"). A differentiator between IoT and conventional networks is a traffic profile. In an IoT, nodes may not have defined or known network positions, communication protocols or security services. Solutions that allow architecture 100 to function seamlessly and leverage such disparate components are disclosed herein.

Architecture 100 may include nodes. Each node may include two or more nodes. FIG. 1 shows exemplary nodes 101, 103, 105, 107 and 109. Nodes 101, 103, 105, 107 and 109 may execute one or more of the functions of the first IoT node, the second IoT node, the third IoT node and/or the IoT hub described herein. The IoT hub may include data depository 101, data analysis engine 109 and/or actuators 107. The IoT hub may include any additional hardware such as receivers, transmitters, processors, databases, and any other suitable hardware.

The architecture includes sensors 103. A sensor 103 may be an IoT node disclosed herein. Sensors 103 may include devices that detect changes in a physical or virtual environment. For example, sensors may measure audio, rainfall, temperature or water levels. Sensors may measure electronic network traffic, electronic signals (e.g., input or output) or frequency of user logins from within a predefined geographic area.

Sensors may be any suitable size. For example, sensors may be a few millimeters in size. Sensors may be deployed in a wide variety of locations. For example, sensors may be deployed in military battlefields, industrial plants, in orchards, in clothing, automobiles, smart phones, jewelry or refrigerators. Sensors may be relatively inexpensive and have low energy consumption. Sensors may "sense" two or more stimuli or environmental changes.

Sensors may implement two or more functions. For example, sensors may measure changes in their native environment, capture data related to the measured changes store and communicate the captured data. Sensors may be accessed by other sensors or any other node. Sensors may transmit captured data to another node. Sensors may broadcast captured data to two or more nodes.

Captured data may be transmitted using any suitable transmission method. For example, data captured by a sensor may be extracted by a mobile phone. Sensors may leverage a communication link provided by a mobile phone to communicate captured data to another node.

Each sensor may be a node and each sensor may be assigned a unique identifier. For example, sensors may be identified by one or more radio frequency identification ("RFID") tags. The RFID tag may be stimulated to transmit identity information about the sensor or any other information stored on the RFID tag.

Captured data may be transmitted by the sensor and processed far from the location of the sensor that captured the data. For example, captured data may be transmitted from one node to another node until the captured data reaches data repository 101.

Sensors maybe positioned and capture data from diverse locations. Locations may include geographic locations or virtual locations on electronic networks. Captured data may be transmitted to a location where information is needed for decisioning or consumption, which may not be the same place the data was captured or generated. Data synchronization protocols and caching techniques may be deployed to ensure availability of information at, or delivery to, a desired node. For example, a location where data is captured may not have continuous reliable network connectivity. Accordingly, captured data may be stored locally on the sensor for an amount of time prior to transmission or broadcast to another node.

Contextually, captured data may provide information not only about the physical environment surrounding a sensor, but the capturing of data from multiple sensors may provide data that signifies an event. Sensors may be grouped. Sensors may be grouped based on physical proximity or based on the content (or expected content) of data captured. Sensors may be grouped virtually. Other nodes, such as data analysis engine 109 may create and/or be included in such groups. In some embodiments, the captured data may be organized by data repository 101.

Based on data captured from sensors 103, actuators 107 may respond to a detected event. Based on the capture and analysis of multiple sources of data, actuators 107 may be instructed to take action without human intervention.

Generally, sensors and other nodes that form part of architecture 100 may include a processor circuit. The processor circuit may control overall operation of a node and its associated components. A processor circuit may include hardware, such as one or more integrated circuits that form a chipset. The hardware may include digital or analog logic circuitry configured to perform any suitable operation.

A processor circuit may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, electronic signatures of biometric features or any other suitable information or data structures. Components of a processor circuit may be coupled together by a system bus, wirelessly or by other interconnections and may be present on one or more circuit boards. In some embodiments, the components may be integrated into a single chip. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor for enabling a node to perform various functions. For example, the non-transitory memory may store software applications used by a node, such as an operating system, application programs, and an associated database. Alternatively, some or all of computer executable instructions of a node may be embodied in hardware or firmware components of the node.

Software application programs, which may be used by a node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

As shown in FIG. 1, a node may operate in a networked environment. A node may be part of two or more networks. A node may support establishing network connections to one or more remote nodes. Such remote nodes may be sensors, actuators or other computing devices. Nodes may be personal computers or servers. Network connections may include a local area network ("LAN") and a wide area network ("WAN"), and may also include other networks. When used in a LAN networking environment, a node may be connected to the LAN through a network interface or adapter. The communication circuit may include the network interface or adapter.

When used in a WAN networking environment, a node may include a modem or other circuitry for establishing communications over a WAN, such as the Internet. The communication circuit may include the modem.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Nodes may include various other components, such as a battery, speaker, and antennas. Network nodes may be portable devices such as a laptop, tablet, smartphone, "smart" devices (e.g., watches, eyeglasses, clothing having embedded electronic circuitry) or any other suitable device for receiving, storing, transmitting and/or displaying relevant information.

A node may include a display constructed using organic light emitting diode ("OLED") technology. OLED technology may enhance functionality of a node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display power must be supplied to the entire backlight, even to illuminate just one pixel in the display. In contrast, an OLED display does not necessarily include a backlight. Furthermore, in an OLED display, preferably, only the illuminated pixel draws power.

The power efficiency of OLED technology presents a possibility for designing nodes that provide enhanced security and functionality. Illustrative devices that may be constructed using OLED technology are disclosed in U.S. Pat. No. 9,665,818, which is hereby incorporated by reference herein in its entirety.

A node may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Nodes may utilize computer-executable instructions, such as program modules, being executed by a computer. Generally, program modules include routines, programs, objects, components, data structures, etc. that perform particular tasks or implement particular abstract data types. A node may be operational with distributed computing environments where tasks are performed by remote processing devices that are linked through a communications network. In a distributed computing environment, program modules may be located in both local and remote computer storage media including memory storage devices. Nodes may rely on a network of remote servers hosted on the Internet to store, manage, and process data (e.g., "cloud computing").

Nodes may include a battery. The battery may be a power source for electronic components of the node. For example, the battery may supply power to the display, the communication circuit and the processor circuit. In some embodiments, a node may include a plurality of batteries. Nodes may include solar panels that convert solar energy into electricity that powers one or more components of a node.

Sensors in a single architecture or other grouping may be produced by different manufacturers. Sensors may capture data in different formats. For example, sensors may use different data structures to package captured data. Sensors 103 may utilize different communication protocols to transmit captured data or communicate with other nodes. Despite such operational differences, sensors 103 may operate substantially seamlessly together. Interoperability may allow captured data to be substantially seamlessly captured and interpreted by data analysis engine 109. Based on interpreting the captured data, data analysis engine 109 may issue instructions to actuators 107.

Interoperability may be implemented across any suitable nodes of architecture 100. Interoperability may enable communication between sensors 103 and other nodes. Interoperability may enable architecture 100 to provide services and applications via actuators 107. Interoperability may allow services and content to be provided anywhere, anytime and based on input/output of different nodes.

Data gathering by one or more of sensors 103 may be controlled by one or more other nodes of architecture 100. For example, data analysis engine 109 may control a quantity of data captured by sensors 103. Alternatively, data repository 101 and/or analysis engine 109 may filter or otherwise intelligently process data captured by sensors 103.

Timing of when data is captured by sensors 103 may be controlled by any suitable node on architecture 100. For example, data may be captured in real-time or at pre-defined intervals such as once a day. Data may also be captured in response to a detected environmental status change.

Data analysis engine 109 may filter data captured by sensors 103. Data analysis engine 103 may repackage or reformat captured data. Data conversion may include transformation of low level raw data (possibly from multiple sensors or groups of sensors) into meaningful information for a target audience or for a target analysis.

For example, captured data intended for human consumption or interaction may be converted into a human understandable format. Captured data intended for machine consumption may be converted into a format readable by a particular machine or node.

Data analysis engine 109 may perform pattern recognition to identify correlations and trends in captured data. Data analysis engine 109 may also evaluate a cost of obtaining data. "Costs" may be monetary (e.g., labor costs or infrastructure costs), time-related or related to a level of intrusion needed to obtain desired data. "Costs" may be bandwidth-related.

For example, a communication link may be associated with a fixed bandwidth. The bandwidth may limit an amount of information or a rate of transmission over the communication link.

For example, a sensor may respond slowly to a request from another node if there is a large amount of informational traffic traveling on a communication link shared with other nodes. The large amount of informational traffic may not leave sufficient bandwidth for the transmitting node to timely communicate with the requesting node.

As a further example, a sensor may respond slowly if the sensor transmits a large amount of captured data. The large amount of information transmitted by the sensor, together with other informational traffic traveling on the shared communication link, may be close to, or exceed the bandwidth of the communication link. As a result, sensors may be unable to transmit captured date in a timely manner.

Data travelling within architecture 100 to/from nodes may be routed along multiple communication links until the transmitted information reaches a desired destination node (e.g., data analysis engine 109). Each communication link may service a number of connected nodes and a respective volume of informational traffic.

It may be difficult to ascertain available bandwidth on a particular communication link. It may be difficult to ascertain which communication links are being utilized to transmit information between nodes. Nodes attempting to transmit information over a communication link may not be aware of a number of connected nodes, a volume of traffic on a particular communication link or a bandwidth capacity of a communication link.

Furthermore, a communication link may be controlled by a different entity from an entity responsible for operation of a particular node. The entity responsible for operation of the node may be unable to monitor a number of nodes that share a communication link, a bandwidth capacity of a communication link or a volume of traffic transmitted on a communication link. Despite difficult to predict conditions on a communication link, it would be desirable for a node to timely respond to a request for information or timely receive desired information.

Sensors 103 may belong to, or operated by, different administrative/management domains. Sensors 103 may be operated by different domains without expressly-defined relationships among such domains. The absence of express relationships enables access to data captured by sensors 103 by one or more architectures having one or more features in common with architecture 100. Groups of sensors may include sensors from two or more administrative domains.

Data repository 101 may receive data captured by sensors 103. In some embodiments, data captured by sensors 103 may be transmitted directly to data analysis engine 109. Data stored in repository 101 may be sorted and analyzed by data analysis engine 109. Data stored in data repository 101 may be so voluminous and complex (e.g., structured/unstructured and/or constantly changing) that traditional data processing application software may be inadequate to meaningfully process the data (e.g., "big data"). Data analysis engine 109 may include software applications specially designed to process large volumes of data ("big data analytics").

Based on captured data, data analysis engine 109 may optimize processes, reduce loss (e.g., fraud), improve customer understanding and targeting, increase automation, decrease latency in products and/or services provided by actuators 107 and identify new analytical models that may utilize data captured by sensors 103.

Architecture 100 may include one or more layers of software applications. Software applications may implement a variety of functions and provide varied services to nodes of architecture 100. Software applications running on data analysis engine 109 may submit requests to sensors 103 for retrieval of specific data to achieve a functional goal provided by actuators 107. Software applications may control data captured by sensors 103 or actions taken by actuators 107. Software applications may control a flow of information within architecture 100.

Software applications may be implemented on a node. A node may be an enterprise system or a "cloud" of computing devices. On device applications may be dependent on a specific hardware configuration. Such hardware requirements may preferably be minimal, such as an extension of the OS/firmware of the device. For example, illustrative software applications for sensors may include TinyOS, Linux, Contiki and RIOT.

Software applications may include middleware. Middleware may connect an operating system or database to other software applications. Middleware may configure and manage hardware such as sensors (e.g., to achieve a target functionality). Middleware may be responsible for aggregating data captured by sensors 103 and passing captured data to data repository 101 and/or data analysis engine 109.

Software applications may provide security services that mitigate threats to the integrity of data captured by sensors 103 or architecture 100 generally.

Actuators 107 may respond to data transmitted or processed by other nodes such as data analysis engine 109. Actuators 107 may include devices that modify the physical state of a physical entity. Actuators 107 may include devices that modify a virtual state of information. For example, actuators 107 may move (translate, rotate, etc.) physical objects or activate/deactivate functionalities of more complex ones. An actuator may dim a light bulb, open a door, change a temperature setting, authorize access to an automated-teller-machine ("ATM") and/or any other suitable functionality. Actuators 107 may verify identities, trigger electronic payments, extend credit or debit accounts.

Within an intelligent networked system such as architecture 100, sensors 103 perform the functions of input devices—they serve as, for example, "eyes," collecting information about their environment. In contrast, actuators 107 act as "hands," implementing decisions based on data captured by sensors 103. A single node may include the functions of sensors and actuators.

Actuators 107 may communicate with data analysis engine 109 and sensors 103. Actuators 107 may include an application programming interface ("API") for communicating with other nodes. Actuators 107 may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision and communication processes for actuators 107.

In the absence of express relationships between sensors and the devices that access data captured by the sensors traditional approaches for managing trust, security naming, discovery, or other traditional network services may not be applicable or available. Apparatus and methods provided herein may provide enhanced maintenance and supervision of IoT systems by assigning owners to different IoT systems and providing the ability to push updates from a central IoT hub to different groups of IoT nodes that may or may not support internet connection.

Generally, nodes of architecture 100 may interact and cooperate using one or more interaction paradigms. Exemplary interaction paradigms include client-server and peer-to-peer interactions. Illustrative communication protocols may include HyperText Transfer Protocol ("HTTP"), Simple Object Access Protocol ("SOAP"), Representational State Transfer ("REST") Constrained Application Protocol ("CoAP") or SensorML.

As a result of the disparate nature of sensors 103, an architecture, such as architecture 100 incorporating sensors 103may support a variety of communication protocols. Illustrative supported protocols may include IEEE 802.15.4 ("ZigBee"), IEEE 802.11, 3G and 4G and LTE. For example, ZigBee requires approximately 20 to 60 mW (for 1 mW transmission power, a range of 10 to 100 meters and a data transmission rate of 250 kbit/s).

To conserve energy, a sensor may communicate wirelessly for short periods of time. Utilizing this approach, one or more standard size single cell cylindrical dry battery batteries (e.g., AA size) may provide requisite computing power and wireless communication for many months.

Communication protocols used by nodes (e.g., sensors or actuators) may not have, or may not be capable of having, security capabilities. A security layer or buffer may be implemented by nodes that receive or rely on data captured by insecure sensors. Sensors or other nodes may be dynamically added or removed from an architecture. A security layer or buffer may be modular to scale quickly and meet growth/contraction requirements.

A physical layer may physically link nodes of architecture 100. The function of this physical layer is to provide communication pathways to carry and exchange data and network information between multiple sub-networks and nodes.

Figure 2:
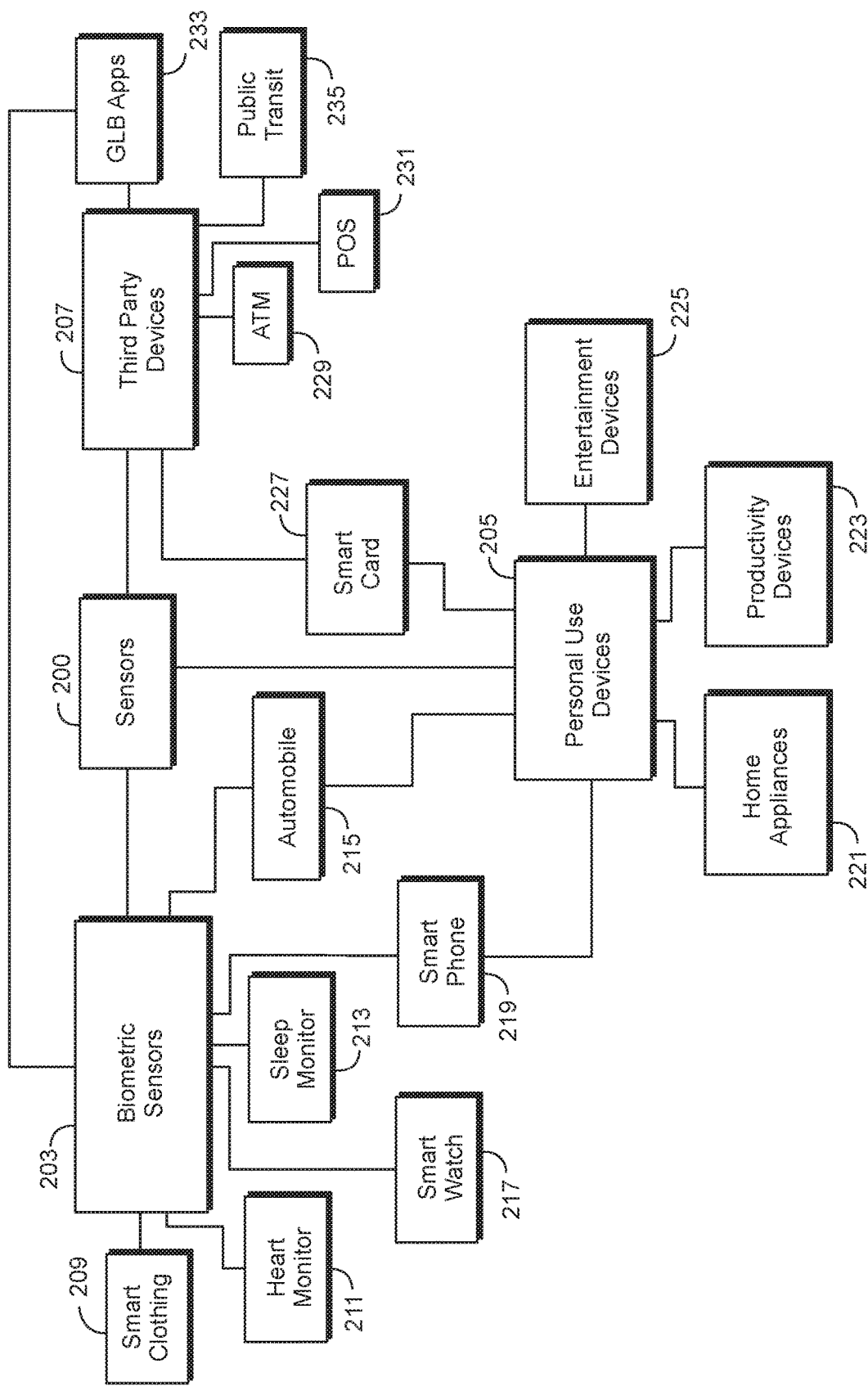
FIG. 2 shows an illustrative system in accordance with the invention.

FIG. 2 shows illustrative sensors 200. Sensors 200 may be IoT nodes. Sensors 200 may include or more features of sensors 103 (shown in FIG. 1). Sensors 200 include biometric sensors 203 that sense biometric attributes. For example, biometric sensors may be embedded in "smart" clothing 209 that monitors a wearer's physical condition. Such clothing may capture biometric data, such as pulse rate, temperature, muscle contraction, heart rhythm and physical movement. Smart clothing may be linked to smart phone 219 such as via a Bluetooth® communication link. Smart phone 219 may transmit data captured by smart clothing 209 to one or more other network nodes.

Biometric sensors 203 may include other illustrative sensors such as heart monitor 211, sleep monitor 213, smart watch 219, smart phone 219 and automobile 215.

Sensors 200 may include personal use devices 205. Personal use devices 205 may include sensors embedded in home appliances 221, productivity devices 223 or entertainment devices 225. Productivity devices 223 may include tablets, laptops or other personal computing devices. Entertainment devices may include gaming consoles and the like.

Sensors 200 also include third-party devices 207. Third-party devices may include devices that are not under the direct or exclusive control of a user. A user may interact with third-party devices 207 to obtain a desired service provided by the third-party.

Exemplary third-party devices include smart card 227. Smart card 227 may function as a purchasing instrument. Illustrative purchasing instruments may conform to specifications published by the International Organization for Standardization. Such specifications may include: ISO/IEC 7810, ISO/IEC 7811 and ISO/IEC 7816, which are hereby incorporated herein by reference in their entireties. Suitable purchasing instruments may include a credit card, debit card and electronic purchasing devices. Such purchasing instruments may sense a location or frequency of use.

Such purchasing instruments may include "EMV" chips. EMV is a technology that derives its name from the companies (Europay, MasterCard, and Visa) that helped develop the technology. When the credit card and its associated EMV chip are inserted into a specialized card reader (another sensor), the reader powers the EMV chip and the EMV chip generates a new authorization code each time the credit card is used. The EMV chip may capture transaction data such as amounts, location or identity of the chip reader.

Third-party sensors 207 may include ATMs 229 and point-of-sale terminals ("POS") 231. Such devices may also be actuators.

Third-party devices may also include software applications 233. Applications 233 may be used to access services, such as an online banking portal. Such applications may detect biometric features to authorize access to the online banking portal. Third-party devices may include sensors that capture data associated with power consumption (e.g., smart grids), electronic communication traffic, logistics (package movement) or any other suitable environmental condition.

FIG. 200 shows that sensors may categorically overlap. For example, an application used to access an online bank portal may capture a biometric feature (e.g., fingerprint) to authenticate a user.

Each of the sensors shown in FIG. 200 may include different and possibly incompatible hardware. For example, sensors may each have different operating systems (or none at all), processor types and memory. Sensors 200 may be inexpensive, single-function devices with rudimentary network connectivity. Sensors 200 may be positioned in remote and/or inaccessible locations where human intervention or configuration is difficult.

To conserve power, sensors 200 may utilize 16-bit microcontrollers. Such microcontrollers may use less than 400 µW per MIPS ("million instructions per second") and may be capable of operating TCP/IPv6 stacks with 4 kB RAM and 24 kB flash memory. As outlined in proposed Internet standard RFC 4944, which is hereby incorporated by reference in its entirety, IPv6 may be implemented over IEEE 802.15.4 (e.g., ZigBee) based wireless communication standards.

Furthermore, because of potentially disparate features and characteristics of sensors 200, security solutions disclosed herein may be used to verify an authenticity of data transmitted by sensors having disparate hardware and software capabilities.

Figure 3:
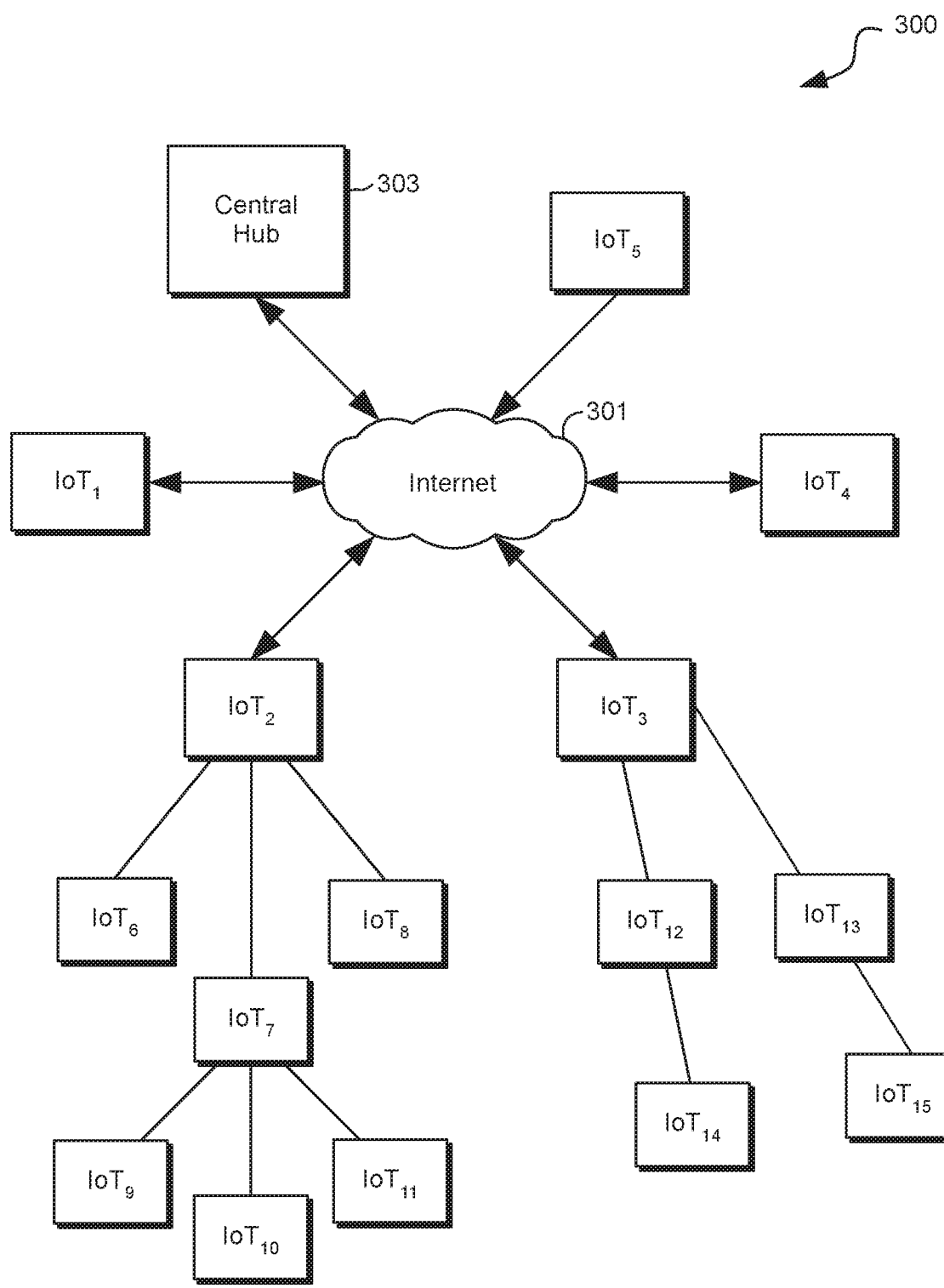
FIG. 3 shows an illustrative system in accordance with the invention.

FIG. 3 shows an illustrative system 300. Illustrative system 300 may include central hub 303. Central hub 303 may have electronic communication with Internet 301. System 300 may also include nodes $IoT_1$, $IoT_2$, $IoT_3$, $IoT_4$ and $IoT_5$. Each of nodes $IoT_1$, $IoT_2$, $IoT_3$, $IoT_4$ and $IoT_5$ have electronic communication with Internet 301.

Nodes $IoT_2$ and $IoT_3$ are each in electronic communication with additional groups of nodes that do not support an interne connection. $IoT_2$ is in electronic communication with nodes $IoT_6$, $IoT_7$, $IoT_8$, $IoT_9$, $IoT_{10}$ and $IoT_{11}$. $IoT_3$ is in electronic communication with nodes $IoT_{12}$, $IoT_{13}$, $IoT_{14}$ and $IoT_{15}$.

Central hub 303 may group nodes $IoT_1$, $IoT_2$, $IoT_3$, $IoT_4$ and $IoT_5$ into the first group and the second group. Central hub 303 may download on the nodes included in the first group the distributed ledger.

Central hub 303 may be assigned as an owner of nodes $IoT_1$, $IoT_2$, $IoT_3$, $IoT_4$ and $IoT_5$.

$IoT_2$ may be assigned as an owner of nodes $IoT_6$, $IoT_7$, $IoT_8$, $IoT_9$, $IoT_{10}$ and $IoT_{11}$. Thus, $IoT_2$ may be an IoT node owner of nodes $IoT_6$, $IoT_7$, $IoT_8$, $IoT_9$, $IoT_{10}$ and $IoT_{11}$, and therefore may own nodes $IoT_6$, $IoT_7$, $IoT_8$, $IoT_9$, $IoT_{10}$ and $IoT_{11}$.

$IoT_3$ may be assigned as an owner of $IoT_{12}$, $IoT_{13}$, $IoT_{14}$ and $IoT_{15}$. Thus, $IoT_3$ may be an IoT node owner of nodes $IoT_{12}$, $IoT_{13}$, $IoT_{14}$ and $IoT_{15}$, and therefore may own nodes $IoT_{12}$, $IoT_{13}$, $IoT_{14}$ and $IoT_{15}$.

When central hub 303 transmits a system update to owners $IoT_2$ and $IoT_3$, owners $IoT_2$ and $IoT_3$ may transmit the system update to their respective owned nodes. In the event that a node owned by an IoT node owner is in communication with a remote node that is not in communication with the IoT owner, the node will be instructed to transmit the system update to the remote node. For example, $IoT_7$ may be instructed to transmit the system update to nodes $IoT_9$, $IoT_{10}$ and $IoT_{11}$ if nodes $IoT_9$, $IoT_{10}$ and $IoT_{11}$ are not in communication with $IoT_2$.

Figure 4:
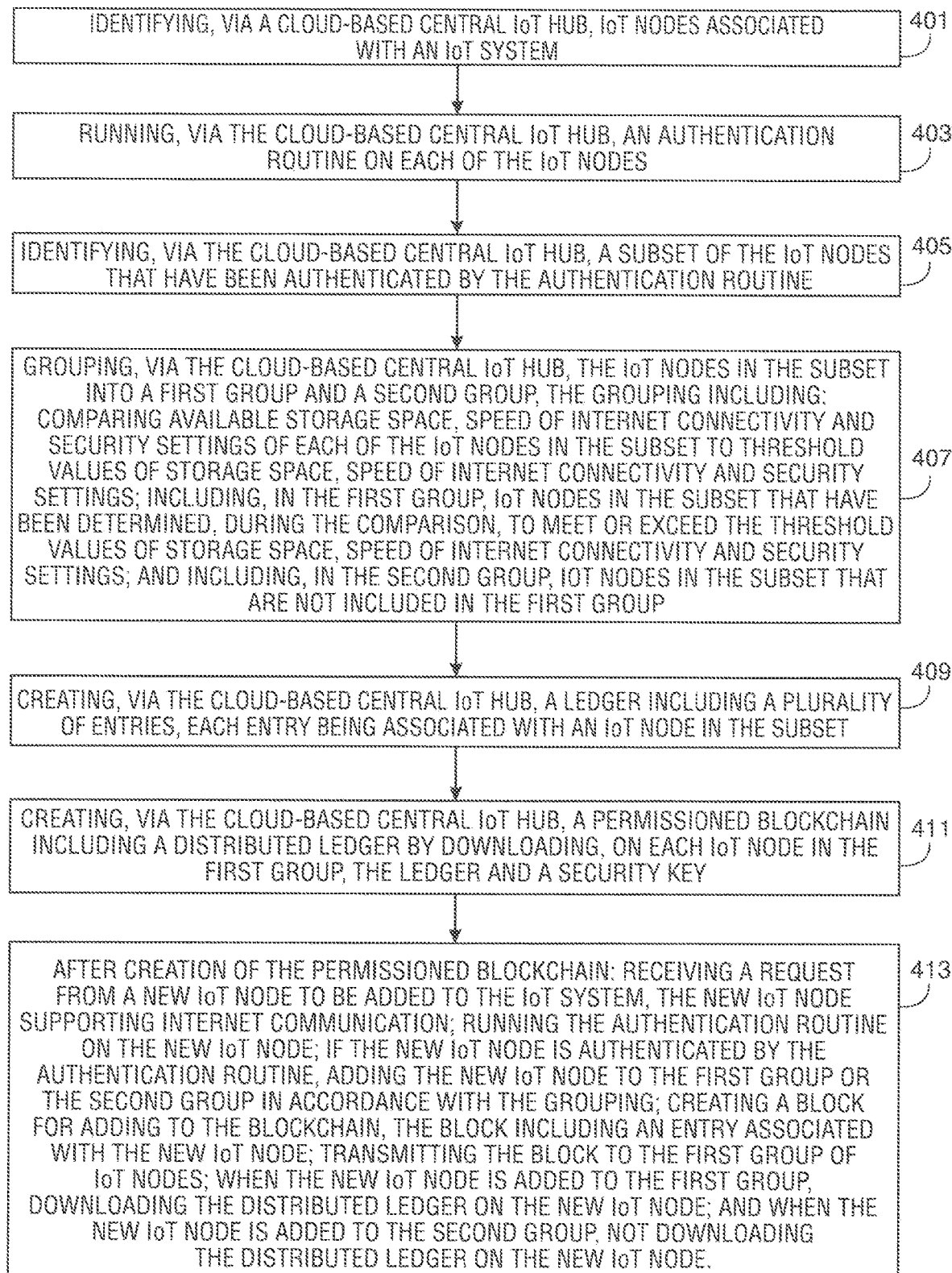
FIG. 4 shows an illustrative method in accordance with the invention.

FIG. 4 shows an illustrative method in accordance with the invention. The method may include, at step 401, identifying, via a cloud-based central IoT hub, IoT nodes associated with an IoT system. The method may include, at step 403, running, via the cloud-based central IoT hub, an authentication routine on each of the IoT nodes. The method may include, at step 405, identifying, via the cloud-based central IoT hub, a subset of the IoT nodes that have been authenticated by the authentication routine. The method may include, at step 407, grouping, via the cloud-based central IoT hub, the IoT nodes in the subset into a first group and a second group, the grouping including: comparing available storage space, speed of internet connectivity and security settings of each of the IoT nodes in the subset to threshold values of storage space, speed of internet connectivity and security settings; including, in the first group, IoT nodes in the subset that have been determined, during the comparison, to meet or exceed the threshold values of storage space, speed of internet connectivity and security settings; and including, in the second group, IoT nodes in the subset that are not included in the first group. The method may include, at step 409, creating, via the cloud-based central IoT hub, a ledger including a plurality of entries, each entry being associated with an IoT node in the subset. The method may include, at step 411, creating, via the cloud-based central IoT hub, a permissioned blockchain including a distributed ledger by downloading, on each IoT node in the first group, the ledger and a security key. The method may include, at step 413, after creation of the permissioned blockchain: receiving a request from a new IoT node to be added to the IoT system, the new IoT node supporting internet communication; running the authentication routine on the new IoT node; if the new IoT node is authenticated by the authentication routine, adding the new IoT node to the first group or the second group in accordance with the grouping; creating a block for adding to the blockchain, the block including an entry associated with the new IoT node; transmitting the block to the first group of IoT nodes; when the new IoT node is added to the first group, downloading the distributed ledger on the new IoT node; and when the new IoT node is added to the second group, not downloading the distributed ledger on the new IoT node.

Thus, systems and methods for a permissioned blockchain have been provided. Persons skilled in the art will appreciate that the present invention can be practiced by other than the described embodiments, which are presented for purposes of illustration rather than of limitation.

What is claimed is:

1. A method for establishing a permissioned blockchain on an Internet of Things ("IoT") system, the method being performed by a cloud-based central IoT hub, the method comprising:
   identifying, via the cloud-based central IoT hub, IoT nodes associated with the IoT system, each of the identified IoT nodes having an IP address and being in communication with the cloud-based central IoT hub via an internet connection, the cloud-based central IoT hub being a central processing unit stored in a cloud;
   running, via the cloud-based central IoT hub, an authentication routine on each of the IoT nodes, the authentication routine including assessing configuration settings and IoT node characteristics of the IoT nodes to assess compliance with a IoT system runbook stored on the cloud-based central IoT hub;
   identifying, via the cloud-based central IoT hub, a subset of the IoT nodes that have been authenticated by the authentication routine;
   grouping, via the cloud-based central IoT hub, the IoT nodes in the subset into a first group and a second group, wherein the grouping includes:
      comparing available storage space, speed of internet connectivity and security settings of each of the IoT nodes in the subset to threshold values of storage space, speed of internet connectivity and security settings;
      including, in the first group, IoT nodes in the subset that have been determined, during the comparison, to meet or exceed the threshold values of storage space, speed of internet connectivity and security settings; and
      including, in the second group, IoT nodes in the subset that are not included in the first group;
   creating, via the cloud-based central IoT hub, a ledger including a plurality of entries, each entry being associated with an IoT node in the subset and including an IP address of the IoT node and configuration information of the IoT node assessed during the authentication routine;
   creating, via the cloud-based central IoT hub, a permissioned blockchain including a distributed ledger by downloading, on each IoT node in the first group, the ledger and a security key; and after creation of the permissioned blockchain:
      receiving a request from a new IoT node to be added to the IoT system, the new IoT node supporting internet communication;
      running the authentication routine on the new IoT node;
      if the new IoT node is authenticated by the authentication routine, adding the new IoT node to the first group or the second group in accordance with the grouping;
      creating a block for adding to the blockchain, the block including an entry associated with the new IoT node, the entry including an IP address of the new IoT node and configuration information assessed during the authentication routine;
      transmitting the block to the first group of IoT nodes;
      when the new IoT node is added to the first group, downloading the distributed ledger on the new IoT node; and
      when the new IoT node is added to the second group, not downloading the distributed ledger on the new IoT node.

2. The method of claim 1 further comprising instructing the first group to only accept blocks for adding to the blockchain that are hashed using the security key and transmitted from a device having an IP address included in the ledger.

3. The method of claim 1 further comprising:
   instructing a first IoT node included in the first group to:
      identify a second IoT node in electronic communication with the first IoT node, wherein the second IoT node connects to the cloud-based central IoT hub via the first IoT node; and
      run at least a portion of the authentication routine on the second IoT node, the authentication routine being transmitted to the first IoT node from the cloud-based central IoT hub;
   in response to the second IoT node being authenticated during the authentication routine, assigning the first IoT node as an owner of the second IoT node and instructing the first IoT node to:
      create a block for adding to the blockchain, the block identifying the second IoT node and the first IoT node as an owner of the second IoT node; and
      transmit the block to the cloud-based central IoT hub and the IoT nodes in the first group; and
   in response to the second IoT node not being authenticated during the authentication routine, instructing the first IoT node to block all communication between the first IoT node and the second IoT node.

4. The method of claim 3 further comprising:
   instructing a third IoT node included in the second group to:
      identify a fourth IoT node in electronic communication with the third IoT node, wherein the fourth IoT node connects to the cloud-based central IoT hub via the third IoT node;
      run at least a portion of the authentication routine on the fourth IoT node, the authentication routine being transmitted to the third IoT node from the cloud-based central IoT hub; and
      transmit results of the authentication routine to the cloud-based central IoT hub;

determine if the fourth IoT node was authenticated during the authentication routine;

in response to the fourth IoT node being determined to be authenticated during the authentication routine:
assigning the third IoT node as an owner of the fourth IoT node;
creating a block for adding to the blockchain, the block identifying the fourth IoT node and the third IoT node as an IoT node owner of the fourth IoT node; and
transmitting the block to IoT nodes in the first group; and in response to the fourth IoT node being determined not to have been authenticated during the authentication routine, instructing the third IoT node to block all communication between the third IoT node and the fourth IoT node.

5. The method of claim 1 further comprising:
instructing each of the IoT nodes in the first group to identify a third group of IoT nodes in electronic communication with the each of the IoT nodes in the first group, the IoT nodes in the third group not supporting electronic communication with the cloud-based central IoT hub;
assigning an IoT node owner to each IoT node included in the third group, the IoT node owner being an IoT node in the first group which is in electronic communication with the owned IoT nodes;
assigning the cloud-based central IoT hub as an owner of the first and second groups of IoT nodes; and
creating a block to add to the blockchain, the block associating each of the IoT nodes in the first, second and third groups with an owner, the owner being either the cloud-based central IoT hub or an IoT node owner.

6. The method of claim 5 further comprising:
instructing each of the IoT nodes in the second group to identify a fourth group of IoT nodes in electronic communication with the each of the IoT nodes in the second group, the IoT nodes in the fourth group not supporting electronic communication with the cloud-based central IoT hub;
assigning an IoT node owner to each IoT node included in the fourth group, the IoT node owner being an IoT node in the second group which is in electronic communication with the owned IoT nodes; and
creating a block to add to the blockchain, the block associating each of the IoT nodes in the fourth group with an IoT node owner, the owner being an IoT node in the second group.

7. The method of claim 6 further comprising upon a lapse of a predetermined time period following the running of the authentication routine:
assessing the compliance of the first and second groups of IoT nodes with the IoT system runbook;
creating a block to add to the blockchain, the block including data associated with the assessed compliance of each of the IoT nodes included in the first and second groups; and
transmitting the block to the first group.

8. The method of claim 7 further comprising:
downloading on each of the IoT node owners at least a portion of the IoT system runbook; and
instructing each of the IoT node owners to:
assess the compliance of the owned IoT nodes with the at least a portion of the IoT system runbook;
create a block to add to the blockchain, the block including data associated with the assessed compliance of the owned IoT nodes; and
transmit the block to the cloud-based central IoT hub and the first group.

9. The method of claim 8 further comprising instructing the IoT node owners to run one or more remedial algorithms on owned IoT nodes that are identified as noncompliant with the IoT system runbook during the assessment.

10. The method of claim 7 further comprising blocking all communications from IoT nodes in the first and second groups determined to be noncompliant with the IoT runbook.

11. The method of claim 6 further comprising performing a system update of the IoT system, the method comprising:
receiving an update to the system IoT runbook;
updating the first and second groups of IoT nodes to conform with the system update and creating one or more blocks identifying the updating of the first and second groups;
instructing each IoT node owner in the first group to:
update IoT nodes in the third groups which are owned by the IoT node owner to conform with the system update; and
create a block for adding to the blockchain, the block identifying the updating of the owned IoT nodes in the third group;
instructing each IoT node owner in the second group to:
update IoT nodes in the fourth group which are owned by the IoT node owner to conform with the system update; and
transmit information associated with the update to the cloud-based central IoT hub; and
creating a block identifying the updating of the IoT nodes in the fourth group.

12. The method of claim 11 further comprising restarting one or more IoT nodes in the first group or the second group that failed to conform with the system update during the updating of the first and second groups of IoT nodes.

13. The method of claim 12 further comprising:
transmitting to each IoT node owner a remedial update routine; and
instructing each IoT node owner to run the remedial update routine on IoT nodes that failed to conform with the system update.

14. The method of claim 6 when the IoT node owners include a first IoT owner and a second IoT owner the method further comprising:
receiving an instruction to delete the first IoT node from the IoT system;
instructing the first IoT node to delete itself from the IoT system;
identifying a group of IoT nodes assigned to the first IoT owner;
assigning the first group of IoT nodes to the second IoT owner; and
creating a new block identifying the second IoT owner as the new owner of the group of IoT nodes.

15. The method of claim 1 further comprising including in each of the plurality of entries a media access control ("MAC") address and configuration information of a node in the subset.

16. The method of claim 1 further comprising after performing the grouping:
determining that available storage space on a first IoT node in the first group has dropped below the threshold value of storage space;

in response to the determination deleting the first IoT node from the first group and adding the first IoT node to the second group; and instructing the first IoT node to delete the distributed ledger from a first IoT node database.

17. The method of claim 1 wherein:

prior to adding the first and second groups of IoT nodes to the ledger, transmitting a confirmation request to a systems manager; and upon receipt of a delete instruction from the systems manager, removing one or more IoT nodes from the first or second group of IoT nodes.

18. The method of claim 1 further comprising:

receiving a request for information transmitted from an IoT node included the first group or the second group, the request including a request for information categorized as sensitive information in an IoT hub database; and transmitting a warning message to a central server identifying the request and the IoT node that transmitted the request.

\* \* \* \* \*